(12) United States Patent
Yamada et al.

(10) Patent No.: US 11,738,605 B2
(45) Date of Patent: Aug. 29, 2023

(54) TIRE

(71) Applicant: BRIDGESTONE CORPORATION, Tokyo (JP)

(72) Inventors: Takumi Yamada, Tokyo (JP); Hiroyuki Fudemoto, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 282 days.

(21) Appl. No.: 17/287,023

(22) PCT Filed: Oct. 25, 2019

(86) PCT No.: PCT/JP2019/041948
§ 371 (c)(1),
(2) Date: Apr. 20, 2021

(87) PCT Pub. No.: WO2020/085496
PCT Pub. Date: Apr. 30, 2020

(65) Prior Publication Data
US 2021/0387483 A1      Dec. 16, 2021

(30) Foreign Application Priority Data
Oct. 26, 2018   (JP) .................... 2018-201890

(51) Int. Cl.
*B60C 15/06*       (2006.01)
*B60C 1/00*        (2006.01)

(52) U.S. Cl.
CPC .. *B60C 15/0603* (2013.01); *B60C 2001/0058* (2013.01)

(58) Field of Classification Search
CPC ........... B60C 15/0603; B60C 15/0607; B60C 2015/061
See application file for complete search history.

(56) References Cited

U.S. PATENT DOCUMENTS

| | | | |
|---|---|---|---|
| 2015/0059955 A1 | 3/2015 | Kouno et al. | |
| 2017/0232697 A1 | 8/2017 | Kouno et al. | |
| 2020/0039296 A1 | 2/2020 | Fukushima et al. | |
| 2020/0164607 A1* | 5/2020 | Hasegawa | B29D 30/50 |

FOREIGN PATENT DOCUMENTS

| | | | |
|---|---|---|---|
| JP | 2011-235835 A | 11/2011 | |
| JP | 2018-111400 A | 7/2018 | |
| WO | 2013/089111 A1 | 6/2013 | |
| WO | WO-2018235501 A1 * | 12/2018 | B29D 30/48 |

OTHER PUBLICATIONS

Machine Translation: WO-2018235501-A1, Hasegawa K, (Year: 2023).*
International Search Report for PCT/JP2019/041948 dated Jan. 28, 2020 (PCT/ISA/210).

* cited by examiner

*Primary Examiner* — Kendra Ly
(74) *Attorney, Agent, or Firm* — Sughrue Mion, PLLC

(57) ABSTRACT

The bead portion of a pneumatic tire has a bead structure including a bead core having a bead cord covered with a resin material, and a bead filler continuous to the bead core and formed of the resin material and tapered outside in the tire radial direction. The bead structure has a weld line of the resin material. The weld line is formed inside in the tire radial direction more than ⅔ of the total height along the tire radial direction of the bead structure.

2 Claims, 4 Drawing Sheets

TIRE

CROSS REFERENCE TO RELATED APPLICATIONS

This application is a National Stage of International Application No. PCT/JP2019/041948 filed Oct. 25, 2019, claiming priority based on Japanese Application No. Patent 2018-201890 filed Oct. 26, 2018.

TECHNICAL FIELD

The present invention relates to a tire in which a part of a bead portion is formed of a resin material.

BACKGROUND ART

Conventionally, a tire having a bead core formed by embedding a bead cord in a thermoplastic resin is known (See Patent literature 1).

CITATION LIST

Patent Literature

[PTL 1] Japanese Unexamined Patent Application Publication No. 2011-235835

SUMMARY OF INVENTION

However, when a portion of the bead portion is formed of a resin material, there are the following problems. Specifically, when the molten resin material is injection molded, a weld line remains at the confluence of the resin material.

The strength of the weld line portion is lower than that of the other portions. Therefore, when a part of the bead portion is formed of a resin material, it is desired that the durability of the bead portion is not affected.

Accordingly, an object of the present invention is to provide a tire in which a part of a bead portion is formed of a resin material and sufficient durability of the bead portion is secured.

One aspect of the present invention is a tire including a tread portion in contact with a road surface, a tire side portion continuous to the tread portion and positioned inside in the tire radial direction of the tread portion, and a bead portion continues to the tire side portion and positioned inside in the tire radial direction of the tire side portion. The bead portion includes a bead structure and the bead structure includes a bead core having a bead cord covered with a resin material, and a bead filler continuous to the bead core and formed of the resin material and tapered outside in the tire radial direction. The bead structure has a weld line of the resin material, and the weld line is formed inside the tire radial direction more than ⅔ of the total height along the tire radial direction of the bead structure.

DESCRIPTION OF EMBODIMENTS

Figure 1:
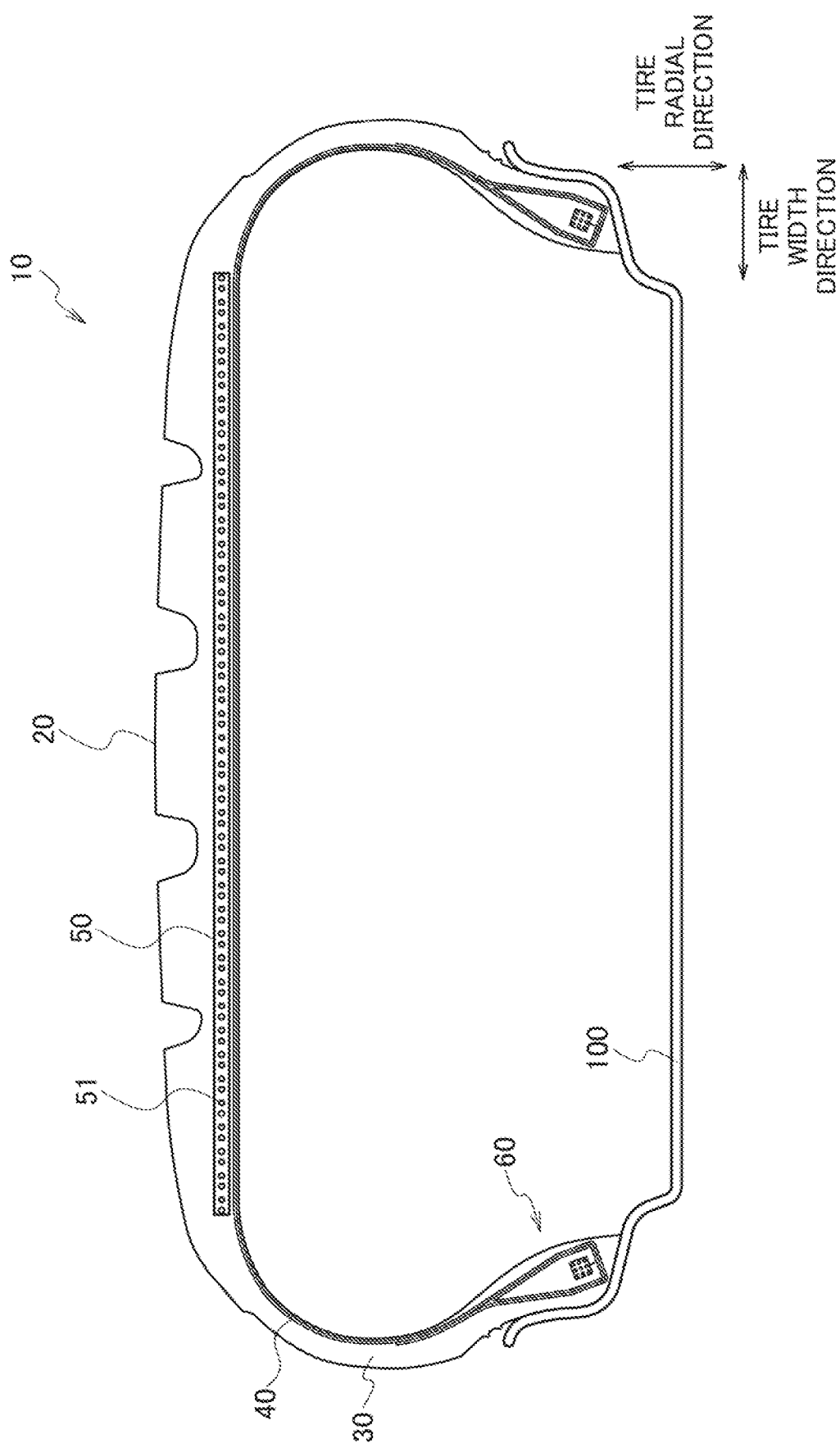
FIG. 1 is a cross-sectional view of a pneumatic tire 10.

Embodiments will be described below with reference to the drawings. The same functions and configurations are denoted by the same or similar reference numerals, and descriptions thereof are omitted as appropriate.

(1) Overall Schematic Configuration of the Tire

FIG. 1 is a sectional view of the pneumatic tire 10 according to the present embodiment. Specifically, FIG. 1 is a sectional view of the pneumatic tire 10 along the tire width direction and the tire radial direction. In FIG. 1, the sectional hatching is not shown (hereinafter the same).

As shown in FIG. 1, the pneumatic tire 10 includes a tread portion 20, a tire side portion 30, a carcass ply 40, a belt layer 50, and a bead portion 60.

The tread portion 20 is a part contacting with a road surface (unillustrated). On the tread portion 20, a pattern (unillustrated) corresponding to the use environment of the pneumatic tire 10 and the kind of a vehicle to be mounted is formed.

The tire side portion 30 continues to the tread portion 20 and is positioned inside in the tire radial direction of the tread portion 20. The tire side portion 30 is a region from the tire width direction outside end of the tread portion 20 to the upper end of the bead portion 60. The tire side portion 30 is sometimes referred to as a side wall or the like.

The carcass ply 40 forms a skeleton of the pneumatic tire 10. The carcass ply 40 has a radial structure in which carcass cords (unillustrated) arranged radially along a tire radial direction are covered with a rubber material. However, the present invention is not limited to the radial structure, and may be a bias structure in which the carcass cords are arranged so as to cross each other in the tire radial direction.

The carcass cord is not particularly limited, and can be formed of an organic fiber cord in the same manner as a tire for a standard passenger car.

The belt layer 50 is provided inside the tire radial direction of the tread portion 20. The belt layer 50 is a single-layer spiral belt having a reinforcing cord 51 and the reinforcing cord 51 is covered with a resin. However, the belt layer 50 is not limited to a single-layer spiral belt. For example, the belt layer 50 may be a two-layer interlaced belt covered with rubber.

As the resin for covering the reinforcing cord 51, a resin material having a tensile modulus higher than that of a rubber material constituting the tire side portion 30 and a rubber material constituting the tread portion 20 are used. As the resin for covering the reinforcing cord 51, a thermoplastic resin having elasticity, a thermoplastic elastomer (TPE), a thermosetting resin or the like can be used. It is desirable to use a thermoplastic resin or a thermoplastic elastomer in consideration of elasticity in running and moldability in manufacturing.

The thermoplastic elastomer includes a polyolefin-based thermoplastic elastomer (TPO), a polystyrene-based thermoplastic elastomer (TPS), a polyamide-based thermoplastic elastomer (TPA), a polyurethane-based thermoplastic elastomer (TPU), a polyester-based thermoplastic elastomer (TPC), a dynamically crosslinked thermoplastic elastomer (TPV), etc.

Examples of the thermoplastic resin include polyurethane resin, polyolefin resin, vinyl chloride resin, polyamide resin, and the like. Further, as the thermoplastic resin material, for example, one having a deflection temperature under load (At 0.45 MPa Load) specified in ISO 75-2 or ASTM D648 of 78° C. or more, a tensile yield strength specified in JIS K7113 of 10 MPa or more, a tensile fracture elongation specified in JIS K7113 of 50% or more, and a Vicat softening temperature (method A) specified in JIS K7206 of 130° C. or more can be used.

The bead portion 60 continues to the tire side portion 30 and positioned inside the tire radial direction of the tire side portion 30. The bead portion 60 has an annular shape extending in the tire circumferential direction.

A part of the bead portion 60 is made of a resin material appropriately selected from the above-mentioned resin materials. In this embodiment, a part of the bead portion 60 is formed of the same resin material as that used for the belt layer 50.

The bead portion 60 is locked to a flange part 110 (Not shown in FIG. 1, see FIG. 2) formed on the radial outside end of the rim wheel 100.

An inner liner (unillustrated) for preventing air (or a gas such as nitrogen) filled in the internal space of the pneumatic tire 10 assembled to the rim wheel 100 from leaking is stuck to the tire inner side surface of the pneumatic tire 10.

(2) Outline of Bead Portion

Figure 2:
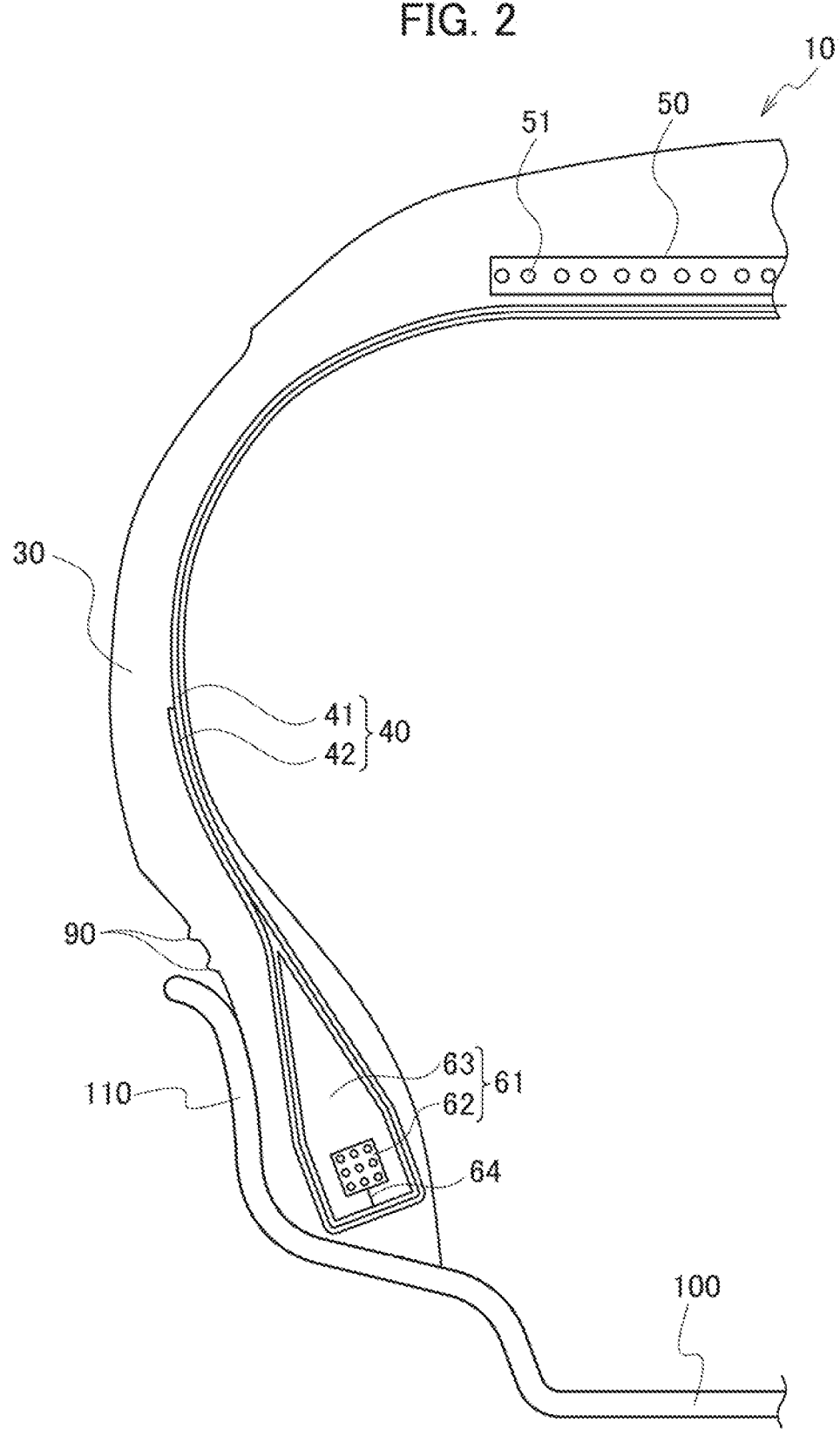
FIG. 2 is a partially enlarged cross-sectional view of the pneumatic tire 10.

FIG. 2 is a partially enlarged cross-sectional view of the pneumatic tire 10. Specifically, FIG. 2 is a partially enlarged sectional view of the pneumatic tire 10 including the bead portion 60 along the tire width direction and the tire radial direction.

As shown in FIG. 2, the carcass ply 40 is folded back outside in the tire width direction via the bead portion 60. Specifically, the carcass ply 40 includes a body portion 41 and a folded portion 42.

The body portion 41 is provided over the tread portion 20, the tire side portion 30 and the bead portion 60, and is a portion until it is folded in the bead portion 60, specifically, a bead core 62.

The folded portion 42 is a portion continued to the body portion 41 and folded back to the outside in the tire width direction via the bead core 62.

The bead portion 60 has the bead structure 61 including the bead core 62 and a bead filler 63. The bead core 62 is formed by coating a bead cord 62 a (Not shown in FIG. 2, see FIG. 3) formed of a metal material (For example, steel.) with a resin material.

The resin material used for the bead core 62 and the bead filler 63 may be the same as the resin material used for the belt layer 50.

The bead filler 63 continues to the bead core 62. Specifically, the bead core 62 and the bead filler 63 are integrally formed. That is, the bead filler 63 is formed of the same resin material as that used for the bead core 62. The bead filler 63 becomes thinner toward the outside in the tire radial direction.

The bead structure 61 has a weld line 64 of the resin material. The bead structure 61 is formed by injection molding of a molten resin material, as will be described later. Therefore, a line called a weld line remains at the joining portion of the resin material.

In this embodiment, the bead structure 61 is positioned radially inward of the rim line 90.

(3) Detailed Configuration of Bead Portion

Next, the detailed configuration of the bead portion 60 will be described. Specifically, an outline of a method of manufacturing the bead structure 61 provided on the bead portion 60 and the position of the weld line 64 formed on the bead structure 61 will be described.

Figure 3:
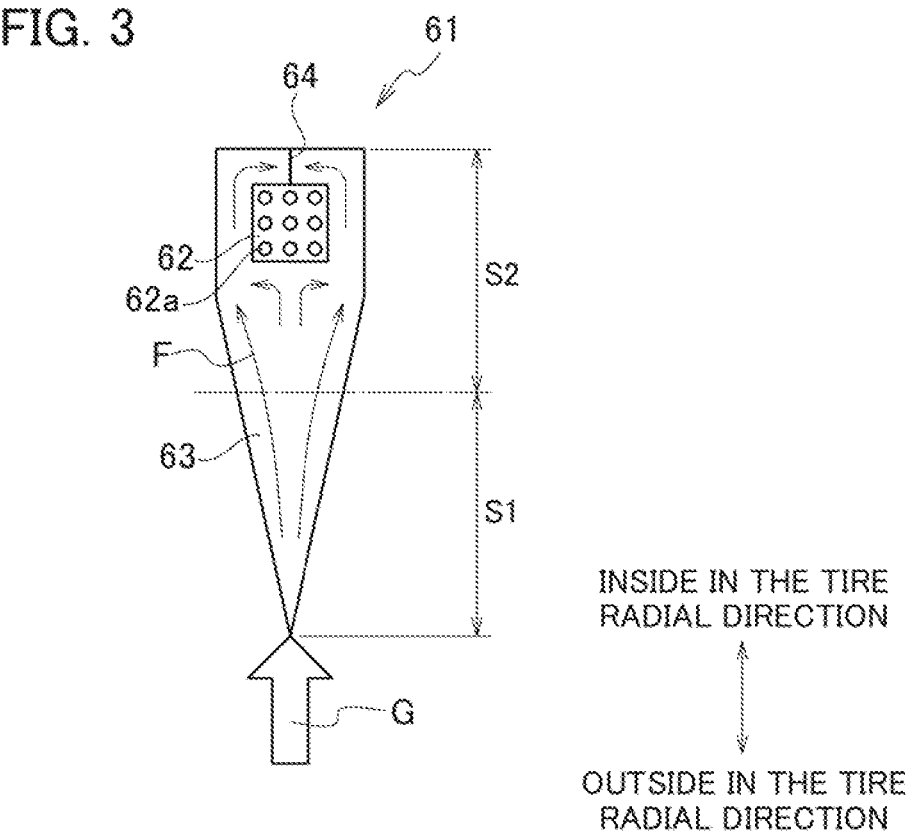
FIG. 3 is a schematic illustration of a method of manufacturing a bead structure 61.

FIG. 3 is a schematic illustration of a method of manufacturing the bead structure 61. As shown in FIG. 3, the bead structure 61 is formed in a predetermined shape by injecting a molten resin material from a gate G. In FIG. 3, a mold for molding the bead structure 61 is not shown.

In FIG. 3, the gate G is provided on the distal end side (outer end of the tire radial direction) of the bead filler 63. Note that in FIG. 3, the bead filler 63 is shown below.

The resin material injected from the gate G provided at such a position flows along the flow path F illustrated in FIG. 3 and merges at the weld line 64. Specifically, the weld line 64 is formed inside the bead core 62 in the tire radial direction.

The weld line 64 is preferably formed inside the tire radial direction more than $2/3$ of the total height along the tire radial direction of the bead structure 61.

The weld line 64 is preferably formed not in the section S1 on the bead filler 63 side but in the section S2 on the bead core 62 side. The section S1 and the section S2 have a height half of the total height along the tire radial direction of the bead structure 61. The section S1 is positioned outside in the tire radial direction, and the section S2 is positioned inside in the tire radial direction.

(4) Function and Effects

According to the embodiment described above, the following effects can be obtained. Specifically, the bead core 62 included in the bead structure 61 of the pneumatic tire 10 is formed by covering the bead cord 62a with a resin material.

The bead structure 61 has a weld line 64 of the resin material, and the weld line 64 is formed inside in the tire radial direction more than $2/3$ of the total height along the tire radial direction of the bead structure 61. Preferably, the weld line 64 is formed in the section S2 (See FIG. 3) inside in the tire radial direction.

That is, by devising the position of the gate G in manufacturing the bead structure 61, the weld line 64 is not formed in the section S1 on the bead filler 63 side. Since the bead filler 63 is tapered outside in the tire radial direction, it is not preferable that the weld line 64 whose strength is reduced as compared with other parts is formed in the section S1 from the viewpoint of durability of the bead structure 61.

That is, in the pneumatic tire 10, the sufficient durability of the bead portion 60 can be secured while a part of the bead portion 60 is formed of a resin material.

In this embodiment, as shown in FIG. 3, the weld line 64 is formed inside the bead core 62 in the tire radial direction. Therefore, the weld line 64 is prevented from being formed at a part of the bead structure 61 constituting the bead filler 63 which becomes narrower toward the outside in the tire radial direction. Thus, the durability of the bead portion 60 can be improved.

(5) Other Embodiments

Although the contents of the present invention have been described above with reference to the examples, it will be obvious to those skilled in the art that the present invention is not limited to these descriptions and that various modifications and improvements are possible.

Figure 4:
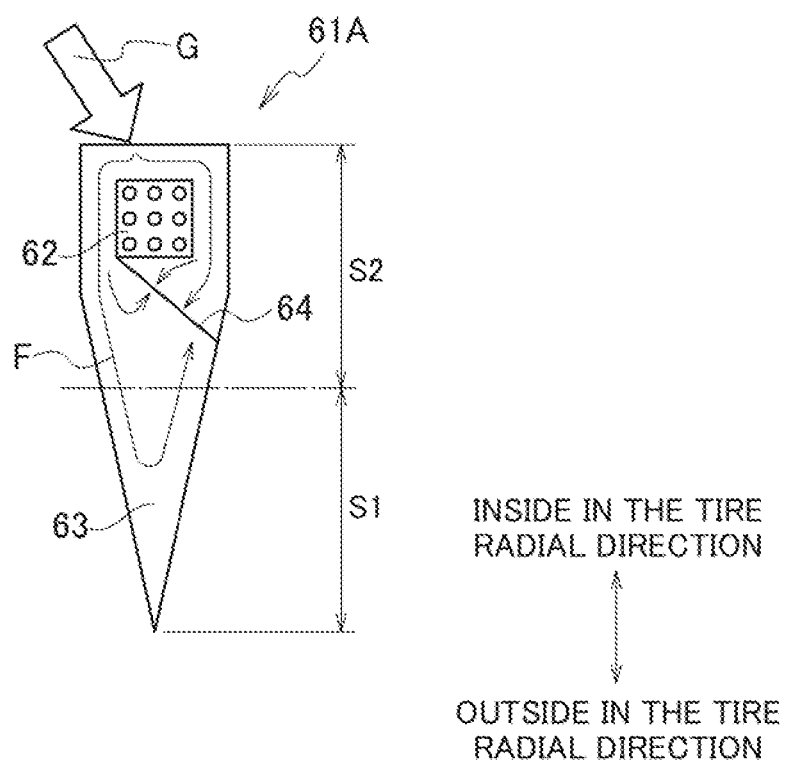
FIG. 4 is a schematic illustration of a method of manufacturing a bead structure 61A according to a modified example.

For example, the structure of the bead portion 60 may be changed as follows. FIG. 4 is a schematic explanatory diagram of a manufacturing method of the bead structure 61 A according to the modified example. In other words, the bead structure 61 A may be provided on the bead portion 60.

As shown in FIG. 4, the gate G is provided inside the bead core 62 in the tire radial direction. The resin material injected from the gate G provided at such a position flows along the flow path F illustrated in FIG. 4 and merges at the weld line 64. Specifically, the weld line 64 is formed outside in the tire radial direction near the bead core 62.

Since the gate G is offset from the center of the bead structure 61 A, specifically, the bead core 62 in the tire width direction, the weld line 64 is formed so as to be inclined in the tire radial direction.

In the bead structure 61 A as well, the weld line 64 is provided in the section S2. The weld line 64 is preferably formed inside the tire radial direction more than ⅔ of the total height of the bead structure 61 A along the tire radial direction.

Figure 5:
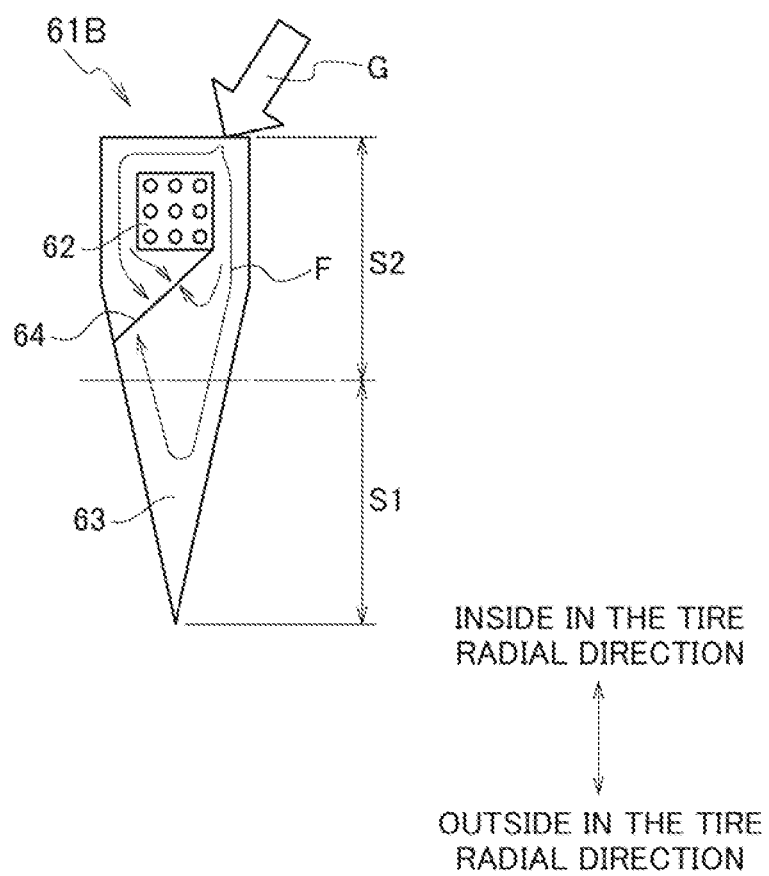
FIG. 5 is a schematic illustration of a method of manufacturing a bead structure 61B according to another modified example.

FIG. 5 is a schematic illustration of a method of manufacturing the bead structure 61 B according to another modification. In other words, the bead structure 61 B may be provided on the bead portion 60.

As in FIG. 4, the gate G is offset from the center of the bead structure 61 B, specifically, the bead core 62 in the tire width direction, so that the weld line 64 is formed to be inclined with respect to the tire radial direction.

In the bead structure 61 B, the weld line 64 is also provided in the section S2. The weld line 64 is formed inside in the tire radial direction more than ⅔ of the total height along the tire radial direction of the bead structure 61 B.

As shown in FIGS. 4 and 5, by forming the weld line 64 so as to be inclined with respect to the tire radial direction, strength characteristics different from those of forming the weld line 64 parallel to the tire radial direction can be imparted to the bead structure, which can contribute to an increase in the tuning width of the characteristics to be imparted to the pneumatic tire 10.

While embodiments of the invention have been described as above, it should not be understood that the statements and drawings which form part of this disclosure are intended to limit the invention. Various alternative embodiments, examples and operating techniques will become apparent to those skilled in the art from this disclosure.

REFERENCE SIGNS LIST

10 Pneumatic tire
20 Tread portion
30 Tire side portion
40 Carcass ply
41 Body portion
42 Folded portion
50 Belt layer
51 Reinforcement cord
60 Bead portion
61, 61 A, 61 B Bead Structure
62 Bead Core
62a Bead cord
63 Bead filler
64 Weld line
90 Rim Line
100 Rim wheels
110 Flange portion
F Channel
G Gate

The invention claimed is:

1. A tire comprising:
a tread portion in contact with a road surface;
a tire side portion continuous to the tread portion and positioned inside in the tire radial direction of the tread portion; and
a bead portion continues to the tire side portion and positioned inside in the tire radial direction of the tire side portion,
wherein the bead portion comprises a bead structure and the bead structure includes:
a bead core having a bead cord covered with a resin material; and
a bead filler continuous to the bead core and formed of the resin material and tapered outside in the tire radial direction,
wherein the bead structure has a weld line of the resin material, and
the weld line is formed inside the tire radial direction more than ⅔ of the total height along the tire radial direction of the bead structure;
wherein the weld line is formed inside the bead core in the tire radial direction.

2. The tire of claim 1, wherein the weld line is inclined relative to the tire radial direction.

* * * * *